(12) United States Patent
Ootomo et al.

(10) Patent No.: US 9,921,010 B2
(45) Date of Patent: Mar. 20, 2018

(54) PARTITIONING MEMBER FOR TOTAL HEAT EXCHANGE ELEMENT, TOTAL HEAT EXCHANGE ELEMENT AND TOTAL HEAT EXCHANGE VENTILATOR USING THE PARTITIONING MEMBER FOR TOTAL HEAT EXCHANGE ELEMENT

(71) Applicant: Panasonic Intellectual Property Management Co., Ltd., Osaka (JP)

(72) Inventors: Miyuki Ootomo, Aichi (JP); Yousuke Hamada, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 504 days.

(21) Appl. No.: 14/410,023

(22) PCT Filed: Aug. 20, 2013

(86) PCT No.: PCT/JP2013/004912
§ 371 (c)(1),
(2) Date: Dec. 19, 2014

(87) PCT Pub. No.: WO2014/041746
PCT Pub. Date: Mar. 20, 2014

(65) Prior Publication Data
US 2015/0198390 A1    Jul. 16, 2015

(30) Foreign Application Priority Data

Sep. 11, 2012 (JP) ................ 2012-199157

(51) Int. Cl.
*F28F 21/06* (2006.01)
*F28D 9/00* (2006.01)
(Continued)

(52) U.S. Cl.
CPC ............ *F28F 21/065* (2013.01); *F24F 3/147* (2013.01); *F28D 9/0037* (2013.01);
(Continued)

(58) Field of Classification Search
CPC .................................................. F28F 2245/02
See application file for complete search history.

(56) References Cited

U.S. PATENT DOCUMENTS 5,534,186 A    7/1996 Walker et al.
5,565,139 A   10/1996 Walker et al.
(Continued)

FOREIGN PATENT DOCUMENTS

CN    102597683    7/2012
JP    60-205193    10/1985
(Continued)

OTHER PUBLICATIONS

"Porous Media Fluid Transport and Pore Structure," Dullien, 1979.*
(Continued)

*Primary Examiner* — Ian Rummel
(74) *Attorney, Agent, or Firm* — McDermott Will & Emery LLP

(57) ABSTRACT

Partitioning member (1) for total heat exchange element includes porous base material (2), and porous base material (2) is filled with hydrophilic polymer compound (3) at a surface and an inside thereof. Hydrophilic polymer compound (3) is formed by polymerizing a low-molecular-weight organic compound having a quaternary ammonium group and an amide group, and represented by chemical formula (1):

(Continued)

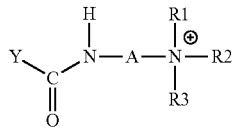

(1)

wherein A is a linear or branched alkylene group having 1 to 10 carbon atoms; R1, R2 and R3 are linear or branched alkyl groups each independently having 1 to 8 carbon atoms; and Y has a polymerizable functional group, and is polymerized to form a main chain of the hydrophilic polymer compound.

13 Claims, 4 Drawing Sheets

(51) Int. Cl.
*F24F 3/147* (2006.01)
*F28D 21/00* (2006.01)
*F24F 12/00* (2006.01)
*F24F 3/14* (2006.01)

(52) U.S. Cl.
CPC ........ *F28D 21/0015* (2013.01); *F24F 12/006* (2013.01); *F24F 2003/1435* (2013.01); *F28F 2245/02* (2013.01); *Y02B 30/563* (2013.01)

(56) References Cited

U.S. PATENT DOCUMENTS

| | | | |
|---|---|---|---|
| 6,228,506 | B1* | 5/2001 | Hosatte .................. B01D 53/28 427/337 |
| 2002/0104439 | A1 | 8/2002 | Komkova et al. |
| 2007/0154703 | A1 | 7/2007 | Waller et al. |
| 2009/0068437 | A1* | 3/2009 | Miyagoshi ............. D21H 13/08 428/314.4 |
| 2009/0071638 | A1 | 3/2009 | Murayama et al. |
| 2012/0205081 | A1 | 8/2012 | Terai et al. |

FOREIGN PATENT DOCUMENTS

| | | |
|---|---|---|
| JP | 6-194093 | 7/1994 |
| JP | 07-019789 A | 1/1995 |
| JP | 09-506545 A | 6/1997 |
| JP | 2003-314983 | 11/2003 |
| JP | 4025476 B | 12/2007 |
| JP | 2008-014623 A | 1/2008 |
| WO | WO 2011073641 A1 * | 6/2011 ............. B01D 61/44 |

OTHER PUBLICATIONS

International Search Report dated Nov. 19, 2013 issued in International Patent Application No. PCT/JP2013/004912.
The Extended European Search Report dated Nov. 5, 2015 for the related European Patent Application No. 3837120.8.
English Translation of Chinese Search Report dated Jan. 15, 2016 for the related Chinese Patent Application No. 201380039278.3.

* cited by examiner

PARTITIONING MEMBER FOR TOTAL HEAT EXCHANGE ELEMENT, TOTAL HEAT EXCHANGE ELEMENT AND TOTAL HEAT EXCHANGE VENTILATOR USING THE PARTITIONING MEMBER FOR TOTAL HEAT EXCHANGE ELEMENT

TECHNICAL FIELD

The present invention relates to a partitioning member for a total heat exchange element, a total heat exchange element obtained using a partitioning member for a total heat exchange element, and a total heat exchange ventilator.

BACKGROUND ART

Conventionally, there have been known heat exchange ventilators that perform heat exchange between supply air and exhaust air during ventilation for cooling and heating. Particularly, in total heat exchange ventilators, which exchange both sensible heat and latent heat, a material having heat conductivity and moisture permeability is used for a partition plate, and sensible heat and latent heat are exchanged in parallel.

The total heat exchange ventilator includes a total heat exchange element for performing heat exchange. The material of the total heat exchange element is required to have gas barrier properties for preventing supply air and exhaust air from being mixed together, particularly a carbon dioxide barrier property, and heat conductivity. Particularly, a total heat exchange element that performs exchange of latent heat in parallel with exchange of sensible heat is also required to have high moisture permeability.

Therefore, for partitioning members for a total heat exchange element, attempts have been made to blend various kinds of agents having moisture permeability, such as calcium chloride and hydrophilic polymer compounds (for example, PTL 1).

In PTL 1, an aqueous solution containing a hydrophilic polymer compound is applied to a porous sheet containing hydrophilic fibers in an amount ranging from 30% by weight to 100% by weight (both inclusive). Then, the hydrophilic polymer compound is made water-insoluble at the surface, the inside or both of the porous sheet. As a result, a sheet for a total heat exchanger is formed, the sheet being a hydrophilic polymer compound-coated sheet having a porous sheet whose pores are filled up.

In such a conventional total heat exchange ventilator, dew condensation may occur in the total heat exchange element. Dew condensation occurs in the total heat exchange element in situations where there is a large difference in temperature between the interior and the outdoors as in tropical regions or cold regions, and where the humidity of either of the interior and the outdoors is higher due to ventilation at a bathroom or high-temperature and high-humidity weather.

The total heat exchange ventilator is required to have gas barrier properties as described above, and is also required to have high moisture permeability for performing latent heat exchange. For example, in PTL 1, an agent for imparting gas barrier properties has moisture permeability. However, when an aqueous solution is applied to a porous base material, and an agent contained in the aqueous solution and having gas barrier properties and moisture permeability is made water-insoluble, the partitioning member for a total heat exchange element does not have sufficient moisture permeability.

In order to compensate for the lack of moisture permeability, a method is generally employed in which an agent having moisture permeability is separately added to a material, as described in PTL 1 shown as an example. However, the agent having moisture permeability is often water-soluble, and in this case, there is a problem that the agent having moisture permeability is dissolved through dew condensation. The agent is dissolved in condensed water deposited on the surface of the partitioning member for a total heat exchange element, or the dissolved agent flows to the outside of the total heat exchange element together with condensed water. Consequently, the agent is lost from the inside of the partitioning member for a total heat exchange element.

As a result, there is a problem that moisture permeation performance of the partitioning member for a total heat exchange element is deteriorated, and latent heat exchange efficiency of the total heat exchange element is reduced. When an agent having moisture permeability is added along with an agent for securing gas barrier properties, there is a problem that the agent having moisture permeability falls out, and from holes thus created, air is leaked, so that gas barrier properties are also deteriorated.

CITATION LIST

Patent Literature

PTL 1: Unexamined Japanese Patent Publication No. 2008-14623

SUMMARY OF THE INVENTION

A partitioning member for a total heat exchange element according to the present invention includes a porous base material, and the porous base material is filled with a hydrophilic polymer compound at a surface and an inside thereof. Two air streams along one surface and the other surface of the porous base material exchange latent heat and sensible heat therebetween. The hydrophilic polymer compound is formed by polymerizing a low-molecular-weight organic compound having a quaternary ammonium group and an amide group, and represented by chemical formula (1):

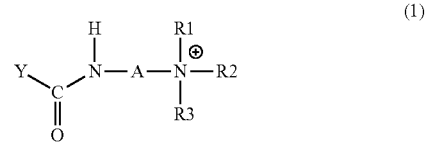

(1)

wherein A is a linear or branched alkylene group having 1 to 10 carbon atoms; R1, R2 and R3 are linear or branched alkyl groups each independently having 1 to 8 carbon atoms; and Y has a polymerizable functional group, and is polymerized to form a main chain of the hydrophilic polymer compound.

The hydrophilic polymer compound has a quaternary ammonium group. The quaternary ammonium group is a strong basic group having large charge deviation, and can attract water molecules. The quaternary ammonium group does not form a hydrogen bond with a water molecule, so that a water molecule is moderately easily moved. The hydrophilic polymer compound has a quaternary ammonium group on a side chain, resulting in ease of intramolecular migration of the quaternary ammonium group. Accordingly, a range of motion of the quaternary ammonium group associated with moisture absorption is wide, so that water is easily absorbed. An amide bond which is hardly hydrolyzed and is hydrophilic exists at a position close to a main chain of the hydrophilic polymer compound, so that water can be attracted. Such a hydrophilic polymer compound has a high content of water molecules, and causes water molecules to be easily moved, so that a partitioning member for a total heat exchange element, which has high moisture absorption performance, is obtained.

DESCRIPTION OF EMBODIMENT

An exemplary embodiment of the present invention will be described below with reference to the drawings.

Exemplary Embodiment

Figure 1:
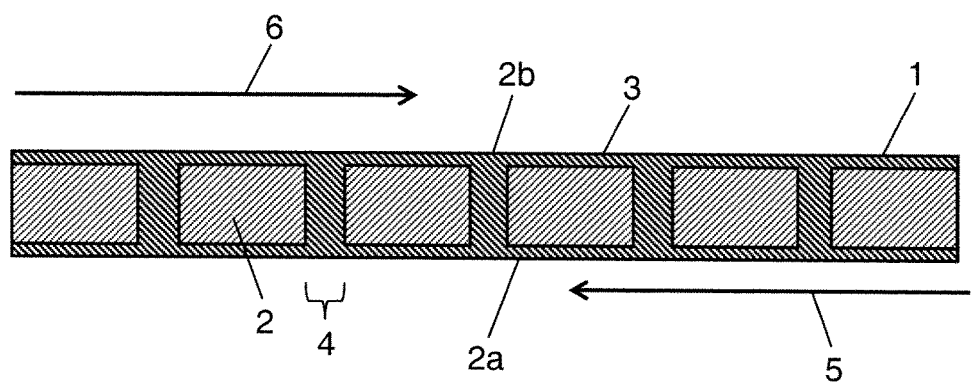
FIG. 1 is a sectional view showing a partitioning member for a total heat exchange element according to an exemplary embodiment of the present invention.

FIG. 1 is a sectional view showing a partitioning member for a total heat exchange element according to the exemplary embodiment of the present invention. As shown in FIG. 1, partitioning member 1 for total heat exchange element includes porous base material 2, and porous base material 2 is filled with hydrophilic polymer compound 3. Porous base material 2 has a large number of pores 4 as though-holes. The inside of pore 4 is filled with hydrophilic polymer compound 3. Thus, porous base material 2 is filled with hydrophilic polymer compound 3 at the surface and inside thereof. Both surfaces of porous base material 2 are coated with hydrophilic polymer compound 3. Two air streams: supply air stream 5 and exhaust air stream 6 exchange heat through partitioning member 1 for total heat exchange element, which is formed as described above. That is, two air streams along one surface $2a$ of porous base material 2 and the other surface $2b$ of porous base material 2 exchange sensible heat and latent heat therebetween.

Pores 4 are filled up with hydrophilic polymer compound 3, so that $CO_2$ generated in an interior space and contaminated air do not pass through partitioning member 1 for total heat exchange element. In other words, partitioning member 1 for total heat exchange element has gas barrier properties. Since hydrophilic polymer compound 3 has high moisture permeability, moisture is exchanged between the interior and the outdoors through partitioning member 1 for total heat exchange element, and ventilation is conducted while interior temperature and humidity conditions are kept as constant as possible.

Figure 2A:
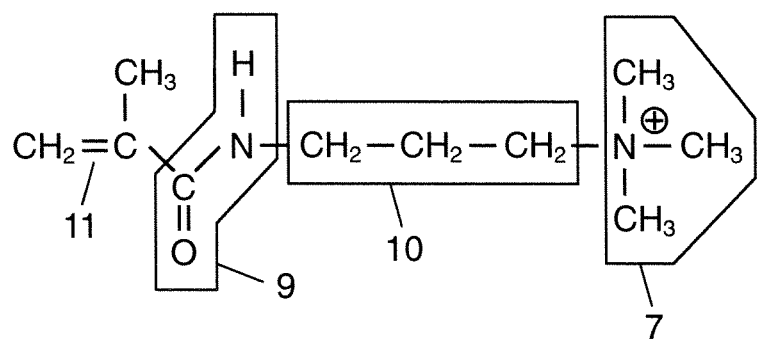
FIG. 2A is a schematic view showing a structure of a low-molecular-weight organic compound to be used for the partitioning member for a total heat exchange element.
Figure 2B:
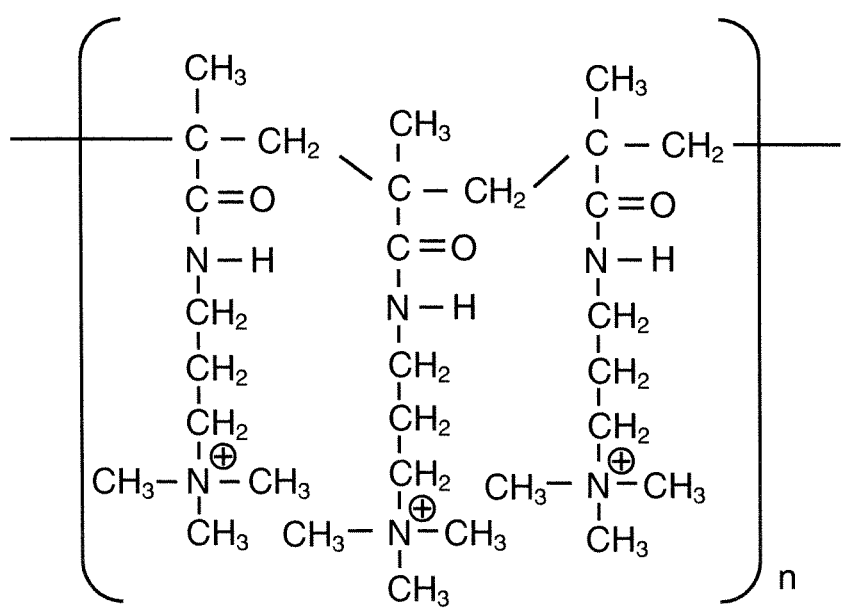
FIG. 2B is a schematic view showing a structure of a hydrophilic polymer compound after polymerization of a low-molecular-weight organic compound to be used for the partitioning member for a total heat exchange element.

FIG. 2A is a schematic view showing a structure of a low-molecular-weight organic compound to be used for the partitioning member for a total heat exchange element according to the exemplary embodiment of the present invention, and FIG. 2B is a schematic view showing a structure of a hydrophilic polymer compound after polymerization of a low-molecular-weight organic compound to be used for the partitioning member for a total heat exchange element.

Hydrophilic polymer compound 3 shown in FIG. 1 is formed by polymerizing a low-molecular-weight organic compound shown in FIG. 2A, the low-molecular-weight organic compound having quaternary ammonium group 7 and an amide group, and represented by chemical formula (1):

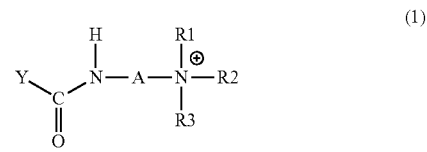

(1)

wherein A is a linear or branched alkylene group having 1 to 10 carbon atoms; R1, R2 and R3 are linear or branched alkyl groups each independently having 1 to 8 carbon atoms; and Y has a polymerizable functional group, and is polymerized to form a main chain of the hydrophilic polymer compound.

Hydrophilic polymer compound 3 may be formed by polymerizing a low-molecular-weight organic compound represented by chemical formula (2):

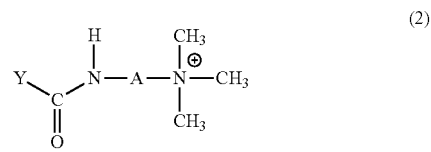

(2)

wherein A is a linear alkylene group having 1 to 10 carbon atoms; and Y is the same as that in chemical formula (1).

Since A in the formula is a linear alkylene group, interference with a range of motion by side chains becomes smaller. Accordingly, the range of motion of quaternary ammonium group 7 is wide, so that water is easily absorbed. Quaternary ammonium group 7 is a functional group having large charge deviation, and can attract water molecules. Owing to a structure in which quaternary ammonium group 7 is bonded to three methyl groups, the periphery of quaternary ammonium group 7 is moderately bulky.

Due to this structure, quaternary ammonium group 7 and a water molecule are easily separated from each other to some degree, so that a water molecule attracted to the vicinity of quaternary ammonium group 7 easily moves, leading to reduction of permeation resistance of water in hydrophilic polymer compound 3. Since the edge of the free end is small, the range of motion of quaternary ammonium group 7 is wide, so that water easily passes. Consequently, the range in which water molecules can exist is increased, and therefore moisture permeability is further improved.

As an example of the low-molecular-weight organic compound to be used for partitioning member 1 for total heat exchange element according to the exemplary embodiment of the present invention, [3-(methacryloylamino)propyl] trimethylammonium chloride is shown in FIG. 2A. [3-(Methacryloylamino)propyl]trimethylammonium chloride has quaternary ammonium group 7 and amide bond 9. [3-(Methacryloylamino)propyl]trimethylammonium chloride has linear alkylene group 10 having 3 carbon atoms, and carbon-carbon double bond 11 as a polymerizable functional group. By at least one of addition of a polymerization initiator and application of energy of light, heat or the like to [3-(methacryloylamino)propyl]trimethylammonium chloride, a polymerization reaction is caused to proceed at carbon-carbon double bond 11 present in [3-(methacryloylamino)propyl]trimethylammonium chloride. In this way, poly[3-(methacryloylamino)propyl]trimethylammonium chloride shown in FIG. 2B is formed.

Figure 3:
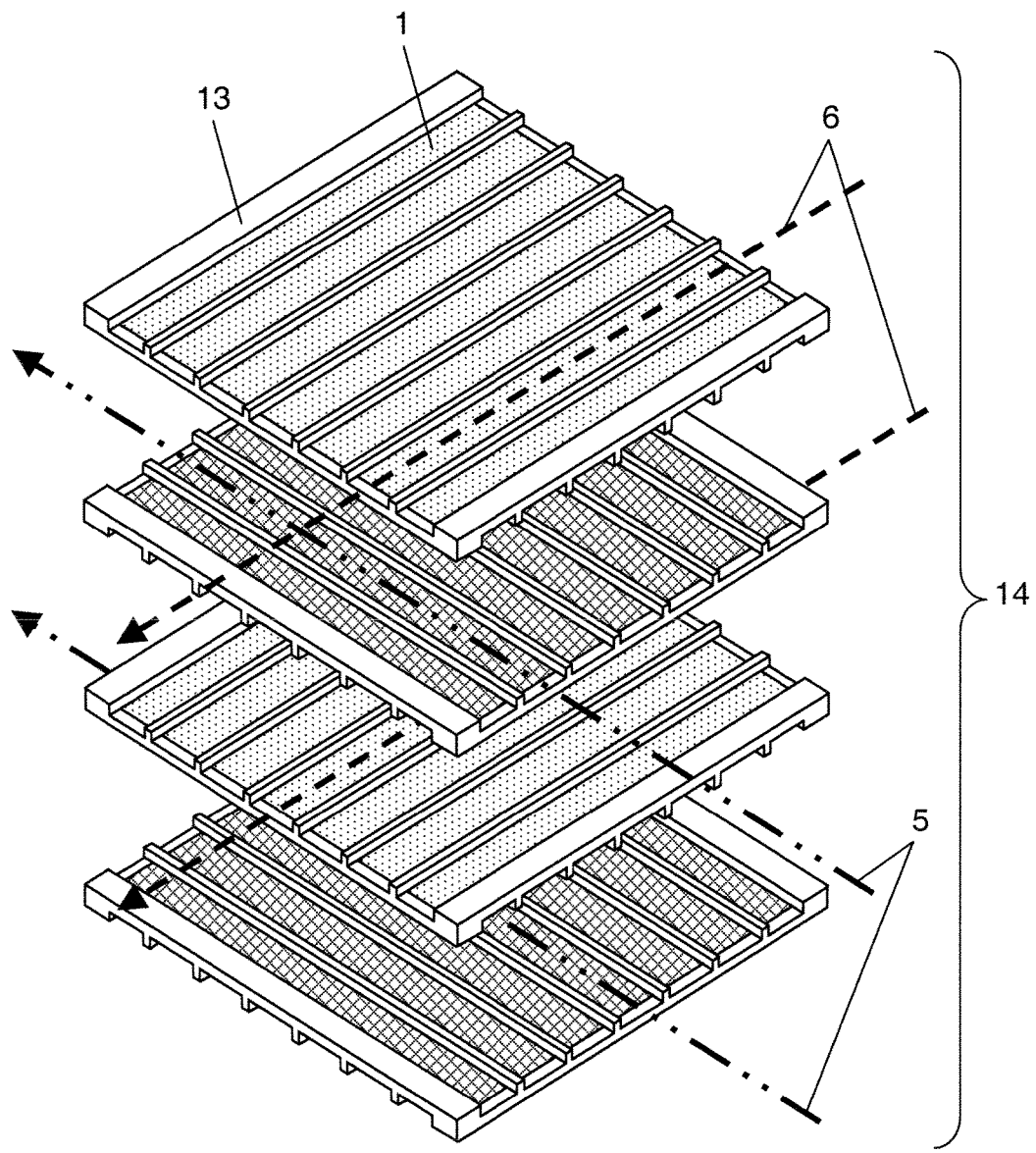
FIG. 3 is a schematic view of the total heat exchange element.

FIG. 3 is a schematic view of a total heat exchange element according to the exemplary embodiment of the present invention. As shown in FIG. 3, total heat exchange element 14 is formed by laminating total heat exchange element pieces 13 using partitioning member 1 for total heat exchange element. Total heat exchange element 14 performs heat exchange as supply air stream 5 and exhaust air stream 6 pass alternately.

Owing to this configuration, total heat exchange element 14 whose total heat exchange efficiency is high and whose gas barrier properties are hardly deteriorated is obtained using partitioning member 1 for total heat exchange element, which has high moisture permeability with deterioration of gas barrier properties suppressed.

As shown in FIG. 2A, [3-(methacryloylamino)propyl]trimethylammonium chloride shown as an example in the exemplary embodiment of the present invention has quaternary ammonium group 7. Quaternary ammonium group 7 is a strong basic group having large charge deviation, and can attract water molecules. Quaternary ammonium group 7 does not form a hydrogen bond with a water molecule, so that a water molecule is moderately easily moved. Hydrophilic polymer compound 3 shown in FIG. 1 has linear alkylene group 10 as a side chain, and has quaternary ammonium group 7 as shown in FIG. 2A, resulting in ease of intramolecular migration of quaternary ammonium group 7. Accordingly, a range of motion of quaternary ammonium group 7 associated with moisture absorption is wide, so that water is easily absorbed. Amide bond 9 shown in FIG. 2 A, which is hardly hydrolyzed and is hydrophilic, exists at a position close to a main chain of hydrophilic polymer compound 3 shown in FIG. 1, so that water can be attracted.

For the reason described above, hydrophilic polymer compound 3 has a high content of water molecules, and causes water molecules to be easily moved, so that partitioning member 1 for total heat exchange element, which has high moisture absorption performance, is obtained.

The low-molecular-weight organic compound to be used for hydrophilic polymer compound 3 is not limited to [3-(methacryloylamino)propyl]trimethylammonium chloride, and quaternary ammonium salts and derivatives thereof can be used. Examples thereof include (3-acrylamidopropyl) trimethylammonium chloride.

Here, in addition to the low-molecular-weight organic compound, an organic compound having two or more polymerizable double bonds in a molecule may be used together as a crosslinking agent. When a crosslinking agent is used, the moisture absorption property of hydrophilic polymer compound 3 after polymerization is adjusted. A polymer having lower water solubility is obtained, and therefore deterioration of gas barrier properties is further suppressed. Examples of the crosslinking agent include N,N'-methylene bisacrylamide, ethylene glycol dimethacrylate, ethylene glycol diacrylate, polyethylene glycol dimethacrylate, polyethylene glycol diacrylate, trimethylolpropane dimethacrylate, trimethylolpropane diacrylate, divinylbenzene, bisphenol dimethacrylate, bisphenol diacrylate, tetraallyloxyethane and triallyamine.

By using these low-molecular-weight organic compounds and the polymerization initiator described later, hydrophilic polymer compound 3 shown in FIG. 1 is obtained. In the exemplary embodiment of the present invention, for example, radical polymerization, anionic polymerization or cationic polymerization is used as a method for polymerizing the low-molecular-weight organic compound. Radical polymerization is particularly preferred, and examples of radical polymerization include redox-initiated polymerization, thermally initiated polymerization and photo-initiated polymerization using electron beams, ultraviolet rays or the like.

Examples of the radical polymerization initiator for thermally initiated polymerization include peroxides such as ammonium persulfate, potassium persulfate, sodium persulfate, hydrogen peroxide, benzoyl peroxide, cumene hydroperoxide and di-t-butyl peroxide. Alternatively, mention is made of azo-based radical polymerization initiators such as 2,2'-azobis-(2-amidinopropane)dihydrochlorides, azobisisobutyronitrile and azobiscyanovaleric acid. These radical polymerization initiators may be used alone, or used in combination of two or more thereof.

Examples of the radical polymerization initiator for redox-initiated polymerization include redox initiators obtained by combining a peroxide with a reducing agent such as a subsulfate, a bisulfite, a thiosulfate, formamidinesulfinic acid or ascorbic acid.

Examples of the radical polymerization initiator for photo-initiated polymerization include benzoin, benzyl, acetophenone, benzophenone, quinone, thioxanthone, thioacridone and derivatives thereof.

Porous base material 2 shown in FIG. 1 may be coated or impregnated with a solution of the low-molecular-weight organic compound, followed by polymerizing the low-molecular-weight organic compound to fill the inside of porous base material 2 with hydrophilic polymer compound 3. By using the low-molecular-weight organic compound, hydrophilic polymer compound 3 penetrates more deeply into porous base material 2 as compared to a case where porous base material 2 is filled with hydrophilic polymer compound 3. Since pores 4 are filled densely with hydrophilic polymer compound 3 along the pore shape, hydrophilic polymer compound 3 becomes hard to fall out from pores 4, on that gas barrier properties are secured.

At least one surfactant may be added to a solution of the low-molecular-weight organic compound. Since the surfactant promotes penetration of the low-molecular-weight organic compound into porous base material 2, so that pores 4 are filled more densely with hydrophilic polymer compound 3 along the pore shape of pores 4, hydrophilic polymer compound 3 is harder to fall out from pores 4, so that the gas barrier properties of partitioning member 1 for total heat exchange element are secured.

The surfactant enhances affinity of porous base material 2 with a solution of the low-molecular-weight organic compound. Examples of the surfactant include cationic surfactants, anionic surfactants, nonionic surfactants, amphoteric surfactants and fluorine-based surfactants. Specific examples of the cationic surfactant include alkyl amine salts such as octadecylamine acetates, and quaternary ammonium salts such as alkyl benzyl dimethyl ammonium chlorides. Examples of the anionic surfactant include fatty acid salts such as sodium stearate soap, alkyl sulfuric acid ester salts such as sodium lauryl sulfate, alkyl benzenesulfonates such as sodium dodecylbenzenesulfonate and alkylphosphates such as potassium alkylphosphate. Examples of the nonionic surfactant include polyoxyethylene alkyl ethers such as polyoxyethylene lauryl ether and polyoxyethylene stearyl ether, and sorbitan fatty acid esters such as sorbitan monolaurate. Examples of the amphoteric surfactant include alkyl betaines such as lauryl betaine and stearyl betaine. Examples of the fluorine-based surfactant include perfluoroalkylcarboxylic acids and perfluoroalkylsulfonic acids.

When a fluorine-based base material such as polytetrafluoroethylene, an ethylene-tetrafluoroethylene copolymer, a polytetrafluoroethylene-perfluoroalkyl vinyl ether copolymer or a polytetrafluoroethylene-propylene hexafluoride copolymer is used as porous base material 2 shown in FIG. 1, use of a fluorine-based surfactant as a surfactant is preferred because a more potent surface activation effect is obtained.

The above-described chemicals are dissolved or dispersed in a solvent to form a solution with which porous base material 2 is impregnated or coated, and the solvent may be water, an organic solvent or the low-molecular-weight organic compound itself. A solvent that well dissolves the low-molecular-weight organic compound should be selected.

As a method for preparing partitioning member 1 for total heat exchange element as shown in FIG. 1, for example, [3-(methacryloylamino)propyl]trimethylammonium chloride as a low-molecular-weight organic compound, N,N'-methylene bisacrylamide as a crosslinking agent, a 2,2'-azobis-(2-amidinopropane)dihydrochloride as a polymerization initiator and sodium dodecylbenzenesulfonate as a surfactant are dissolved in water to prepare an aqueous solution. Then, porous base material 2 made of, for example, polyethylene is soaked in the aqueous solution, an excessive aqueous solution is removed, and then porous base material 2 is heated to prepare partitioning member 1 for total heat exchange element.

The mass fraction of the low-molecular-weight organic compound to the whole solution is preferably between 10 wt % and 99.99 wt % (both inclusive), more preferably between 30 wt % and 99.99 wt % (both inclusive). When the mass fraction of the low-molecular-weight weight organic compound is less than 10 wt %, a sufficient monomer concentration may not be obtained during polymerization. When the mass fraction of the low-molecular-weight weight organic compound is more than 99.99 wt %, the inside of porous base material 2 may not be sufficiently filled with hydrophilic polymer compound 3 because the concentrations of other components: a surfactant and a polymerization initiator are insufficient.

When a crosslinking agent is used, the mass fraction of the crosslinking agent to the whole solution is preferably between 0.01 wt % and 20 wt % (both inclusive). When the mass fraction of the crosslinking agent is less than 0.01 wt %, a sufficient effect as a crosslinking agent may not be obtained, and when the mass fraction of the crosslinking agent is more than 20 wt %, the network structure of hydrophilic polymer compound 3 may become finer to make it hard for water to be moved, leading to deterioration of moisture permeation performance.

The mass fractions of the polymerization initiator and surfactant to the whole solution are each preferably between 0.001 wt % and 10 wt % (both inclusive). When the mass fraction of the polymerization initiator or surfactant falls out of the above-mentioned range, polymerization may become insufficient, and the inside of porous base material 2 may not be sufficiently filled with hydrophilic polymer compound 3.

Further, when [3-(methacryloylamino)propyl]trimethylammonium chloride is used, the molecular weight thereof is increased to enhance hydrophobicity after polymerization although [3-(methacryloylamino)propyl]trimethylammonium chloride is a hydrophilic molecule. Accordingly, [3-(methacryloylamino)propyl]trimethylammonium chloride becomes less soluble in water. As a result, partitioning member 1 for total heat exchange element is obtained, which is hardly soluble in condensed water, so that degradation by dew condensation is suppressed.

When a radical polymerization initiator is used as described above, a polymer compound having a large molecular weight is generated from the early stage at the start of polymerization. Therefore, molecules having a large molecular size are easily generated, so that falling of hydrophilic polymer compound 3 from porous base material 2 is suppressed. When [3-(methacryloylamino)propyl]trimethylammonium chloride is used, low-molecular-weight organic compounds can be polymerized through a covalent bond between carbon atoms as illustrated. Since the generated covalent bond is not hydrolyzed, generated hydrophilic polymer compound 3 is hard to be hydrolyzed. For this reason, partitioning member 1 for total heat exchange element, which has high water resistance performance and gas barrier properties, is obtained The average of the diameters of pores 4 of porous base material 2 shown in FIG. 1 is between 0.01 µm and 100 µm (both inclusive), more preferably between 0.5 µm and 5 µm (both inclusive), and the thickness of porous base material 2 is between 0.1 µm and 200 µm (both inclusive), more preferably between 1 µm and 60 µm (both inclusive). When the diameter of pore 4 is less than 0.01 µm, the inside of pore 4 is hard to be filled with hydrophilic polymer compound 3, so that fine space are generated in porous base material 2 to cause resistance to movement of water. Accordingly, moisture permeation performance as partitioning member 1 for total heat exchange element may be deteriorated. When the diameter of pore 4 is more than 100 µm, hydrophilic polymer compound 3 filling the inside of porous base material 2 may change its volume due to absorption/desorption of water, and thus fall out from porous base material 2, leading to deterioration of gas barrier properties. Further, when the thickness of porous base material 2 is less than 0.1 µm, the strength of porous base material 2 may be excessively reduced, resulting in insufficient strength as partitioning member 1 for total heat exchange element. When the thickness of porous base material 2 is more than 200 µm, moisture permeation performance as partitioning member 1 for total heat exchange element may become insufficient because the movement distance for water to pass through the inside of porous base material 2 becomes longer, so that resistance to movement of water is increased.

For example, porous base material 2 of the exemplary embodiment of the present invention has a porosity from 5% to 95% (both inclusive), more preferably from 50% to 95% (both inclusive). When the porosity is less than 5%, the ratio of pores may be excessively reduced, resulting in insufficient moisture permeation performance as partitioning member 1 for total heat exchange element. When the porosity is more than 95%, the ratio of pores may be excessively increased, resulting in insufficient strength as partitioning member 1 for total heat exchange element.

When porous base material 2 is thin, or a material having high optical transparency is used for porous base material 2, a photopolymerization initiator is used. As a result, a heating and drying furnace, which is required when a thermal polymerization initiator is used, is unnecessary, so that production can be performed with less energy.

The material of porous base material 2 of the present invention is not particularly limited as long as it has water resistance. Examples thereof as an inorganic material include glass and ceramics such as alumina and silica. Examples thereof as an organic material include polyethylene, polypropylene, polyurethane, polytetrafluoroethylene, cellulose acetate, nitrocellulose, hemp, polyester, polyketone, polyamide, ethylene-tetrafluoroethylene copolymers, polytetrafluoroethylene-perfluoroalkyl vinyl ether copolymers and polytetrafluoroethylene-propylene hexafluoride copolymers. The shape is not particularly limited as long as the above-described requirements are satisfied, and porous base material 2 may be in the form of a film, a nonwoven fabric or a woven fabric, and may be a single material or a composite material. Particularly, glass, alumina, silica, polyurethane, cellulose acetate, nitrocellulose, hemp, polyamide or the like that forms hydrophilic porous base material 2 is preferred.

More preferably, pore 4 shown in FIG. 1 is not linear, but is in a complicated shape such that pore 4 has a curved portion, is branched, or changed in pore size in some mid point. This is because particularly when pore 4 is in a linear shape, the possibility is higher as compared to other shapes that hydrophilic polymer compound 3 changes its volume due to absorption/desorption of water, and thereby falls out from porous base material 2, leading to deterioration of gas barrier properties.

In the exemplary embodiment of the present invention, both surfaces of porous base material 2 are coated with hydrophilic polymer compound 3, but the same effect is obtained when only one surface of porous base material 2 is coated with hydrophilic polymer compound 3.

Figure 4:
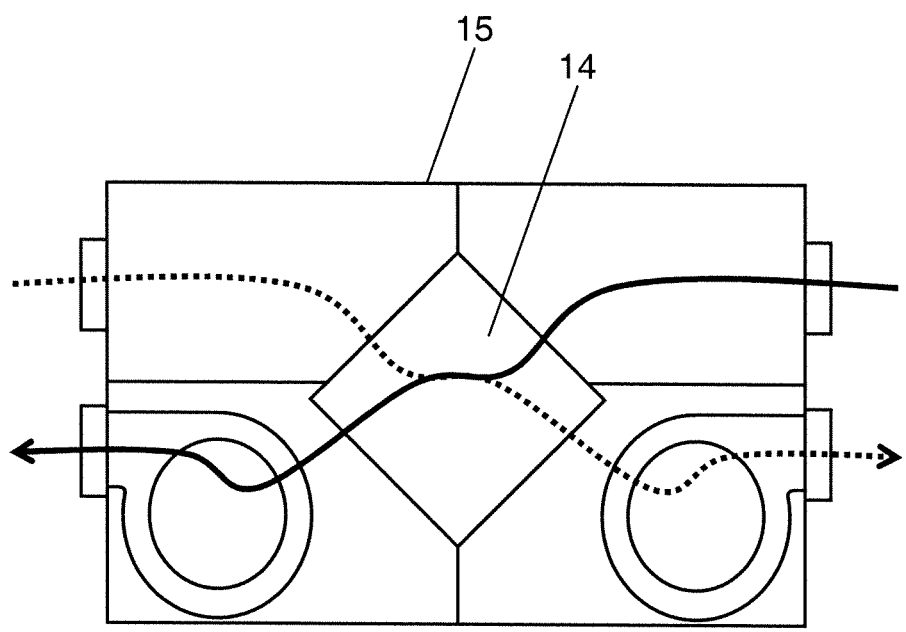
FIG. 4 is a schematic view of a total heat exchange ventilator obtained using the total heat exchange element.

FIG. 4 is a schematic view of a total heat exchange ventilator obtained using the total heat exchange element of the present invention. As shown in FIG. 4, total heat exchange ventilator 15 includes total heat exchange element 14. Total heat exchange ventilator 15 as described above has high total heat exchange efficiency, and reduced deterioration of gas barrier properties.

INDUSTRIAL APPLICABILITY

The partitioning member for a total heat exchange element according to the present invention is useful for heat exchange between an exhaust air stream for exhausting air in the interior and a supply air stream for supplying outer air in the interior.

REFERENCE MARKS IN THE DRAWINGS 1 partitioning member for total heat exchange element
2 porous base material
3 hydrophilic polymer compound
4 pore
5 supply air stream
6 exhaust air stream
7 quaternary ammonium group
9 amide bond
10 alkylene group
11 carbon-carbon double bond
13 total heat exchange element piece
14 total heat exchange element

The invention claimed is:

1. A partitioning member for a total heat exchange element, the partitioning member comprising:

a porous base material having a first surface, a second surface opposite to the first surface and through-holes passing through the porous base material; and a hydrophilic polymer compound filling the through-holes and disposed on at least one of the first surface and the second surface, wherein:

the hydrophilic polymer compound is formed by polymerizing a low-molecular-weight organic compound having a quaternary ammonium group and an amide group, and represented by chemical formula (1):

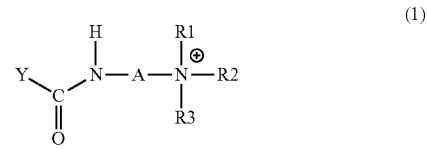

(1)

wherein A is a linear or branched alkylene group having 1 to 10 carbon atoms; R1, R2 and R3 are linear or branched alkyl groups each independently having 1 to 8 carbon atoms; and Y has a polymerizable functional group, and is polymerized to form a main chain of the hydrophilic polymer compound, an average diameter of the through-holes shown is between 0.01 μm and 100 μm, both inclusive, and the porous base material is made of one selected from the group consisting of polytetrafluoroethylene, an ethylene-tetrafluoroethylene copolymer, a polytetrafluoroethylene-perfluoroalkyl vinyl ether copolymer and a polytetrafluoroethylene-propylene hexafluoride copolymer.

2. The partitioning member according to claim 1, wherein the hydrophilic polymer compound is formed by polymerizing a low-molecular-weight organic compound represented by chemical formula (2):

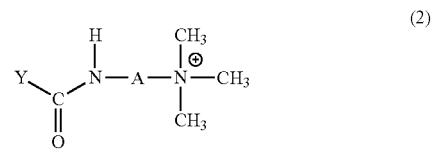

(2)

wherein A is a linear alkylene group having 1 to 10 carbon atoms; and Y is the same as that in chemical formula (1).

3. A total heat exchange element comprising:
a plurality of total heat exchange element pieces that are stacked; and
a plurality of partitioning members disposed on each of the plurality of total heat exchange element pieces, each of the plurality of partitioning members being the partitioning member according to claim 1.

4. A total heat exchange ventilator comprising:
the total heat exchange element according to claim 3.

5. A total heat exchange element comprising:
a plurality of total heat exchange element pieces that are stacked; and
a plurality of partitioning members disposed on each of the plurality of total heat exchange element pieces, each of the plurality of partitioning members being the partitioning member according to claim 2.

6. A total heat exchange ventilator comprising:
the total heat exchange element according to claim 5.

7. The partitioning member according to claim 1, wherein the porous base material has a porosity from 5% to 95%, both inclusive.

8. The partitioning member according to claim 1, wherein the porous base material has a porosity from 50% to 95%, both inclusive.

9. The partitioning member according to claim 1, wherein the hydrophilic polymer compound is disposed on both the first and second surfaces.

10. The partitioning member according to claim 1, wherein the hydrophilic polymer compound is formed by polymerizing a low-molecular-weight organic compound impregnated or coated on the porous base material.

11. The total heat exchange element according to claim 3, wherein the partitioning member is configured so that two air streams along one surface and the other surface of the porous base material exchange latent heat and sensible heat therebetween.

12. The partitioning member according to claim 1, wherein the through-holes have a curved portion.

13. The partitioning member according to claim 1, wherein the through-holes do not have a linear shape.

\* \* \* \* \*